United States Patent
Hagino et al.

(10) Patent No.: US 10,627,204 B2
(45) Date of Patent: Apr. 21, 2020

(54) COEFFICIENT-OF-THERMAL-EXPANSION MEASUREMENT METHOD AND MEASURING DEVICE FOR COEFFICIENT OF THERMAL EXPANSION

(71) Applicant: MITUTOYO CORPORATION, Kawasaki-shi, Kanagawa (JP)

(72) Inventors: Takeshi Hagino, Tsukuba (JP); Yuichiro Yokoyama, Abiko (JP)

(73) Assignee: MITUTOYO CORPORATION, Kawasaki (JP)

( * ) Notice: Subject to any disclaimer, the term of this patent is extended or adjusted under 35 U.S.C. 154(b) by 236 days.

(21) Appl. No.: 15/827,589

(22) Filed: Nov. 30, 2017

(65) Prior Publication Data
US 2018/0180396 A1    Jun. 28, 2018

(30) Foreign Application Priority Data
Dec. 22, 2016 (JP) .................. 2016-249859

(51) Int. Cl.
| G01N 25/16 | (2006.01) |
| G01B 5/00 | (2006.01) |
| G01B 5/008 | (2006.01) |
| G01B 5/28 | (2006.01) |
| G01B 7/34 | (2006.01) |

(52) U.S. Cl.
CPC .......... *G01B 5/0014* (2013.01); *G01B 5/008* (2013.01); *G01B 5/0009* (2013.01); *G01B 5/28* (2013.01); *G01B 7/34* (2013.01); *G01N 25/16* (2013.01)

(58) Field of Classification Search
CPC .............................. G01N 25/16; G01B 5/0014
USPC ..................... 33/503, 502, 1 BB; 374/55, 43
See application file for complete search history.

(56) References Cited

U.S. PATENT DOCUMENTS

| 6,941,669 B2* | 9/2005 | Shivaswamy ........ G01B 5/0014 33/502 |
| 9,500,698 B2* | 11/2016 | Jing ...................... G02F 1/1309 |
| 9,518,944 B2* | 12/2016 | Yokoyama ............... G01N 1/44 |
| 10,352,678 B2* | 7/2019 | Yokoyama ............. G01B 5/008 |
| 2001/0045021 A1* | 11/2001 | Matsuda ................... G01B 3/30 33/502 |
| 2002/0152625 A1* | 10/2002 | Kushibiki .............. G01B 5/061 33/555 |

(Continued)

FOREIGN PATENT DOCUMENTS

| JP | 2004-226369 A | 8/2004 |
| JP | 3897655 B2 | 3/2007 |

*Primary Examiner* — Christopher W Fulton
(74) *Attorney, Agent, or Firm* — Oliff PLC

(57) ABSTRACT

A step gauge and a reference gauge block are placed in a temperature-controlled chamber in parallel with each other. A temperature of the step gauge is changed to a first temperature and a second temperature using a measurement-target temperature adjuster and the temperature-controlled chamber. A distance between a first surface and a second surface of the step gauge is relatively measured at each of the first and second temperatures with reference to a distance between a first reference surface and a second reference surface of the reference gauge block. A coefficient of thermal expansion of the measurement target is calculated from the length of the measurement target at the first temperature and the length of the measurement target at the second temperature.

9 Claims, 10 Drawing Sheets

(56) References Cited

U.S. PATENT DOCUMENTS

| | | | |
|---|---|---|---|
| 2002/0167988 A1* | 11/2002 | Zhu | G01N 25/16 |
| | | | 374/55 |
| 2005/0283989 A1* | 12/2005 | Pettersson | G01B 21/045 |
| | | | 33/502 |
| 2015/0003494 A1* | 1/2015 | Yokoyama | G01N 25/16 |
| | | | 374/55 |
| 2015/0131697 A1* | 5/2015 | Sakai | G01B 21/045 |
| | | | 374/56 |

* cited by examiner

FIG.4
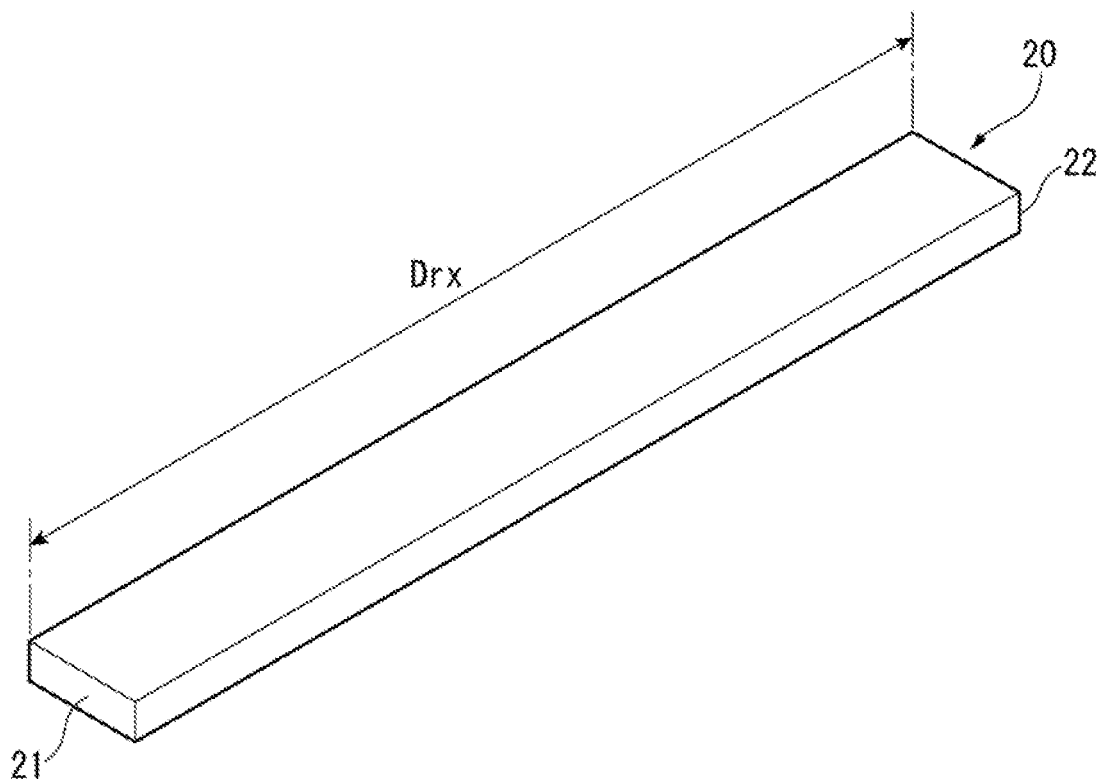
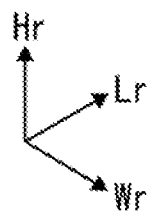

COEFFICIENT-OF-THERMAL-EXPANSION MEASUREMENT METHOD AND MEASURING DEVICE FOR COEFFICIENT OF THERMAL EXPANSION

The entire disclosure of Japanese Patent Application No. 2016-249859 filed Dec. 22, 2016 is expressly incorporated by reference herein.

TECHNICAL FIELD

The present invention relates to a coefficient-of-thermal-expansion (CTE) measurement method and a measuring device for coefficient of thermal expansion (CTE measuring device).

BACKGROUND ART

Dimension reference gauges are used in testing measuring devices such as coordinate measuring machines.

Step gauges corresponding to a plurality of lengths as well as various gauge blocks whose end-to-end dimension is highly accurately calibrated are used for the dimension reference gauge.

The step gauges are comb-shaped components having alternately arranged protrusions and recesses, where a plurality of reference dimensions are defined between end faces of the protrusions. The step gauges are produced by alternately arranging measurement blocks defining the protrusions and spacer blocks defining the recesses, and fixing the arranged blocks on a holder. Alternatively, the step gauges are produced by cutting a single component into a form of the comb-shaped component.

A calibration value of the end-to-end dimension of the step gauges is defined as a length at a specific temperature and is often defined as a length at 20 degrees C. (industrial standard temperature).

In testing a coordinate measuring machine, the measured length has to be converted to a length at a temperature for the calibration. Such conversion is usually referred to as a length temperature correction. At this time, it is necessary that a coefficient of thermal expansion (CTE) of the step gauge is accurately known.

The CTE used for the temperature correction is written in a calibration certificate or a test certificate for most of the dimension reference gauges including step gauges. Such a CTE is indicated with tolerance.

When a step gauge is used for testing a coordinate measuring machine, the tolerance is considered as a factor of uncertainty in determining uncertainty of the test. Accordingly, it is required that the CTE of the step gauge is highly accurately evaluated in order to reduce the uncertainty in the test.

The CTE of an object including a dimension reference gauge is obtained by changing the temperature of the object and measuring a length variation of the object due to the temperature change.

Specifically, a CTE $\alpha$ is given by a formula $\alpha=(\Delta L/L)\cdot(1/\Delta T)$, where $\Delta T=T-T_o$ (T: a current temperature, $T_o$: a reference temperature) represents the temperature variation, and $\Delta L=L-L_o$ (L: a length of the object at the current temperature T, $L_o$: a length of the object at the reference temperature $T_o$) represents the length variation (thermal expansion).

In a dimension reference gauge such as a step gauge, the length L of the object is more than $10^5$ times larger than the length variation $\Delta L$. Accordingly, the accuracy of the value of the length L has relatively a small impact on the value of the CTE $\alpha$.

Accordingly, in order to highly accurately calculate the CTE $\alpha$, it is necessary to highly accurately measure the temperature variation $\Delta T$ and the length variation $\Delta L$.

In order to measure the CTE $\alpha$ of an object, a measurement method using an optical interferometer has been proposed (see Patent Literature 1: JP 3897655 B).

In Patent Literature 1, two pairs of optical interferometers opposed on a common measurement axis are used to highly accurately measure an end-to-end dimension of a measurement target (e.g. gauge block). Then, the measurement target is directly heated with a soaking plate brought into contact with the measurement target, and measured in length at different temperatures. A thus-obtained thermal expansion due to temperature change is used to calculate the CTE.

However, such a CTE measurement method uses the soaking plate to heat the measurement target. Thus, only a surface of the measurement target in contact with the soaking plate is locally heated, causing an uneven temperature distribution of the measurement target. Consequently, a thermal expansion in the measurement target fails to be even to cause an error in the measurement of the CTE.

In order to address such a problem, a method using a temperature-controlled chamber for controlling a temperature of a step gauge has been proposed (see Patent Literature 2: JP 2004-226369 A).

In the method disclosed in Patent Literature 2, the step gauge (measurement target) is placed in the temperature-controlled chamber. Further, a probe of an external coordinate measuring machine is introduced through an opening of the temperature-controlled chamber and the length of the step gauge is measured using the probe. A temperature setpoint of the inside of the temperature-controlled chamber is changed to measure the length at different temperatures. A thus-obtained thermal expansion due to temperature change is used to calculate a CTE.

In such a measurement method, the temperature of a gas inside the temperature-controlled chamber is regulated to a constant value, and the temperature of the step gauge is indirectly changed with the gas. The temperature of the step gauge can thus become even, allowing for a highly accurate CTE measurement.

However, in the method of Patent Literature 2, the temperature of the step gauge is gradually changed because the temperature is indirectly changed via the gas. Such a method requires a long time to stabilize the temperature of the step gauge at the temperature setpoint, and is thus unlikely to achieve an efficient measurement.

SUMMARY OF THE INVENTION

An object of the invention is to provide a coefficient-of-thermal-expansion (CTE) measurement method and a measuring device for coefficient of thermal expansion (CTE measuring device) that are capable of highly accurately measuring a coefficient of thermal expansion (CTE) in a short time.

According to an aspect of the invention, a coefficient-of-thermal-expansion measurement method for measuring a coefficient of thermal expansion of a measurement target having first and second surfaces, the method includes: providing: a temperature-controlled chamber configured to house the measurement target, the temperature-controlled chamber having an adjustable internal temperature; a distance measuring device configured to measure a distance between the first surface and the second surface, at least one measurement-target temperature adjuster placed in the temperature-controlled chamber and configured to heat or cool the measurement target; and a measurement-target thermometer attached to the measurement target and configured to measure a temperature of the measurement target; placing the measurement target in the temperature-controlled chamber; heating or cooling the measurement target using the temperature-controlled chamber and the measurement-target temperature adjuster after a temperature setpoint of the temperature-controlled chamber and the measurement-target temperature adjuster is set at a first temperature; measuring the distance between the first surface and the second surface after a temperature measured by the measurement-target thermometer is determined to be stabilized at the first temperature; heating or cooling the measurement target using the temperature-controlled chamber and the measurement-target temperature adjuster after the temperature setpoint of the temperature-controlled chamber and the measurement-target temperature adjuster is changed to a second temperature; measuring the distance between the first surface and the second surface after the temperature measured by the measurement-target thermometer is determined to be stabilized at the second temperature; and calculating the coefficient of thermal expansion of the measurement target from the distance between the first surface and the second surface at the first temperature and the distance between the first surface and the second surface at the second temperature.

In the above aspect, the temperature of the measurement target is directly changed using the measurement-target temperature adjuster, while being indirectly changed using the temperature-controlled chamber. Such heating can shorten the time required to evenly stabilize the temperature of the measurement target at the temperature setpoint, allowing the CTE of the measurement target to be highly accurately measured in a short time.

In the above aspect, it is preferable that the at least one measurement-target temperature adjuster includes measurement-target temperature adjusters attached to at least a pair of faces of the measurement target at symmetric positions with respect to a center axis of the measurement target.

The above arrangement allows the temperature of the measurement target to be changed at the symmetric positions with respect to the center axis of the measurement target. The temperature of the measurement target can thus be evenly changed, shortening the time required to evenly stabilize the entire measurement target at the temperature setpoint and, consequently, allowing the CTE of the measurement target to be measured in a short time.

In the above aspect, it is preferable that an output of the measurement-target temperature adjuster is adjusted depending on a difference between the temperature measured by the measurement-target thermometer and the temperature setpoint of the measurement-target temperature adjuster.

The above arrangement allows the output of the measurement-target temperature adjuster to be increased in response to a larger difference between the measurement temperature of the measurement target and the temperature setpoint, and to be reduced in response to a smaller difference. Such increase and reduction of the output allows for promptly changing the temperature of the measurement target and preventing an excessive change of the temperature, thereby shortening the time required to stabilize the temperature of the measurement target at the temperature setpoint and, consequently, allowing for measuring the CTE of the measurement target in a short time.

In the above aspect, it is preferable that the measurement-target temperature adjuster stops operating when a difference between the temperature measured by the measurement-target thermometer and the temperature setpoint falls below a desired threshold.

The above arrangement can prevent the temperature of the measurement target from being excessively changed, shortening the time required to stabilize the temperature of the measurement target at the temperature setpoint and, consequently, allowing for measuring the CTE of the measurement target in a short time.

In the above aspect, it is preferable that a heat capacity of the measurement-target temperature adjuster is smaller than a heat capacity of the measurement target.

The above arrangement allows the measurement-target temperature adjuster to have less affect on the temperature of the measurement target after the operation of the measurement-target temperature adjuster is stopped, shortening the time required to stabilize the temperature of the measurement target at the temperature setpoint and, consequently, allowing for measuring the CTE of the measurement target in a short time.

In the above aspect, it is preferable that the method further includes providing a reference gauge having a first reference surface and a second reference surface respectively corresponding to the first surface and the second surface, a distance from the first reference surface to the second reference surface being known; placing the reference gauge in the temperature-controlled chamber along with the measurement target; and relatively measuring the distance between the first surface and the second surface with reference to a distance between the first reference surface and the second reference surface.

The above arrangement allows the length of the measurement target to be measured using the reference gauge as a length master. Such relative measurement of the length with reference to the length of the reference gauge enables a measurement result to be dependent not on the scale accuracy of the distance measuring device but solely on the accuracy of the reference gauge. The length of the measurement target can thus be highly accurately measured.

In the above aspect, it is preferable that the reference gauge is made of an ultra-low or zero coefficient-of-expansion material whose expansion due to a temperature change between the first temperature and the second temperature is negligible in terms of accuracy, or made of a material whose coefficient of expansion is known.

The above arrangement can eliminate the necessity of temperature correction of the length of the reference gauge between the first temperature and the second temperature when the reference gauge is made of an ultra-low or zero coefficient-of-expansion material. Further, when the reference gauge is made of a material having a known coefficient of expansion, a highly accurate length of the reference gauge can be calculated at each of the first temperature and the second temperature through a temperature correction. Since the accurate reference gauge length at each of the temperatures can be known in either of the instances, the relative measurement at the first temperature and the relative measurement at the second temperature can be highly accurately performed.

In the above aspect, it is preferable that the method further includes providing: a reference-gauge temperature adjuster placed in the temperature-controlled chamber and configured to heat or cool the reference gauge; and a reference-gauge thermometer attached to the reference gauge and configured to measure a temperature of the reference gauge; heating or cooling the measurement target and the reference gauge using the temperature-controlled chamber, the measurement-target temperature adjuster and the reference-gauge temperature adjuster after a temperature setpoint of the temperature-controlled chamber, the measurement-target temperature adjuster and the reference-gauge temperature adjuster is set at the first temperature; relatively measuring the distance between the first surface and the second surface after the temperature measured by each of the measurement-target thermometer and the reference-gauge thermometer is determined to be stabilized at the first temperature; heating or cooling the measurement target and the reference gauge using the temperature-controlled chamber, the measurement-target temperature adjuster and the reference-gauge temperature adjuster after the temperature setpoint of the temperature-controlled chamber, the measurement-target temperature adjuster and the reference-gauge temperature adjuster is changed to the second temperature; relatively measuring the distance between the first surface and the second surface after the temperature measured by each of the measurement-target thermometer and the reference-gauge thermometer is determined to be stabilized at the second temperature; and calculating the coefficient of thermal expansion of the measurement target from the distance between the first surface and the second surface at the first temperature and the distance between the first surface and the second surface at the second temperature.

The above arrangement allows the temperature of the reference gauge to be directly changed using the reference-gauge temperature adjuster, while being indirectly changed using the temperature-controlled chamber. Thus, time for the temperature of the reference gauge to be evenly stabilized at the temperature setpoint can be made substantially equal to the time for the measurement target to be evenly stabilized at the temperature setpoint, which allows for relatively measuring the length of the measurement target with reference to the thermal expansion of the reference gauge. The CTE of the measurement target can thus be measured with a higher accuracy.

It should be noted that the reference-gauge temperature adjuster is attached at a position corresponding to that of the measurement-target temperature adjuster, and has function and characteristics similar to those of the measurement-target temperature adjuster.

According to another aspect of the invention, a coefficient-of-thermal-expansion measuring device configured to measure a coefficient of thermal expansion of a measurement target having first and second surfaces, the device includes: a temperature-controlled chamber configured to house the measurement target, the temperature-controlled chamber having an adjustable internal temperature; a distance measuring device configured to measure a distance between the first surface and the second surface; a measurement-target temperature adjuster placed in the temperature-controlled chamber and configured to change the temperature of the measurement target; and a measurement-target thermometer attached to the measurement target and configured to measure a temperature of the measurement target.

According to the above aspect, the same effects and advantages can be obtained as those of the above-described CTE measurement method through the process mentioned in relation to the CTE measurement method.

In the above aspect, it is preferable that the distance measuring device is a coordinate measuring machine, and the temperature-controlled chamber is provided with a measurement opening through which a measurement probe of the coordinate measuring machine is introduced into the temperature-controlled chamber to reach a measurement surface of the measurement target.

The above arrangement allows for measuring the length of the measurement target using the coordinate measuring machine. The CTE of the measurement target can thus be highly accurately measured without using a costly optical interferometer.

The above aspects can provide a coefficient-of-thermal-expansion (CTE) measurement method and a measuring device for coefficient of thermal expansion (CTE measuring device) that are capable of highly accurately measuring a CTE of a measurement target in a short time.

BRIEF DESCRIPTION OF DRAWING(S)

FIG. 4 is a perspective view showing a reference gauge block (a reference gauge according to the first exemplary embodiment).

DESCRIPTION OF EMBODIMENT(S)

Exemplary embodiment(s) of the invention will be described below with reference to the attached drawings.

First Exemplary Embodiment

FIGS. 1 to 5 show a first exemplary embodiment of the invention.

Figure 1:
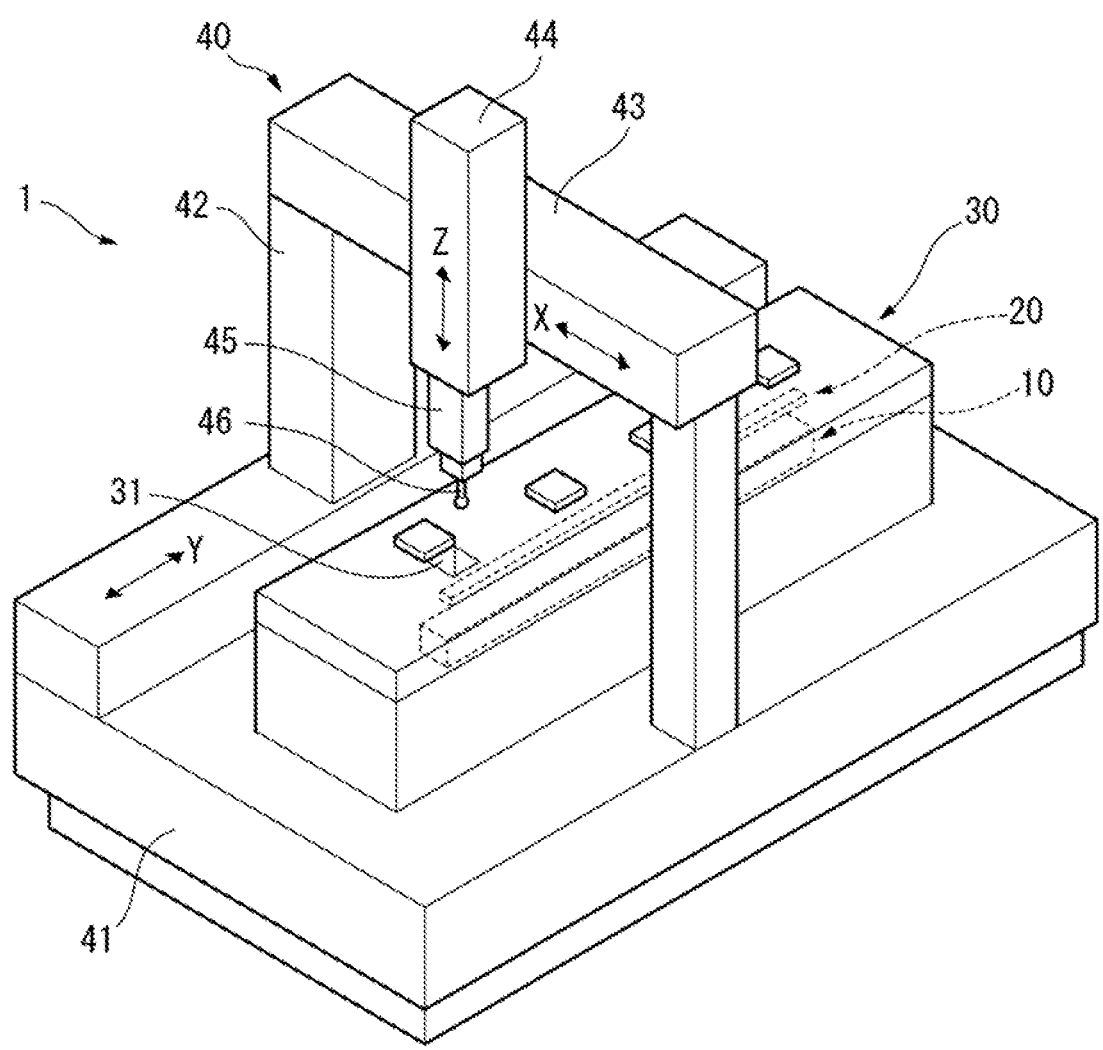
FIG. 1 is a perspective view showing a measuring device according to a first exemplary embodiment of the invention.

As shown in FIG. 1, a measuring device for coefficient of thermal expansion (CTE measuring device) 1 according to the first exemplary embodiment is configured to highly accurately measure a coefficient of thermal expansion (CTE) a of a dimension reference gauge in a form of a step gauge 10.

Accordingly, the CTE measuring device 1 includes a temperature-controlled chamber 30 configured to house the step gauge 10 therein and keep the step gauge 10 at a predetermined temperature, a reference gauge block 20 (reference gauge) configured to be housed in the temperature-controlled chamber 30, and a coordinate measuring machine 40 configured to relatively measure a length of the step gauge 10 with reference to the reference gauge block 20.

As shown in FIG. 1, the coordinate measuring machine 40 includes a measurement table 41. A head 44 is supported above the measurement table 41 via a column 42 and a crossbar 43. A ram 45 extending downward is provided to the head 44. A probe 46 is supported at a distal end of the ram 45.

The column 42 of the coordinate measuring machine 40 is movable in a Y-axis direction with respect to the measurement table 41. The head 44 is movable in an X-axis direction with respect to the crossbar 43. The ram 45 is movable in a Z-axis direction with respect to the head 44. Such a three-axis movement allows the probe 46 to three-dimensionally move with respect to the measurement table 41.

The temperature-controlled chamber 30 is a device having a box-shaped casing and configured to keep the temperature inside the casing at a desired temperature. The temperature-controlled chamber 30 is mounted and fixed on an upper face of the measurement table 41 with a longitudinal direction of the temperature-controlled chamber 30 being aligned with the Y-axis direction.

An upper face of the temperature-controlled chamber 30 is openable and closable so as to house the step gauge 10 and the reference gauge block 20 inside the temperature-controlled chamber 30.

A plurality of measurement openings 31 each having an openable and closable lid are provided on the upper face of the temperature-controlled chamber 30.

The step gauge 10 is supported inside the temperature-controlled chamber 30 so that a longer direction Lt of the step gauge 10 extends along the Y-axis direction. The reference gauge block 20 is placed in a manner facing an upper side of the step gauge 10 (i.e. a side of the step gauge 10 oriented to face the measurement opening 31) and is supported so that a longer direction Lr of the reference gauge block 2 extends along the Y-axis direction (i.e. in parallel with the step gauge 10).

Figure 2:
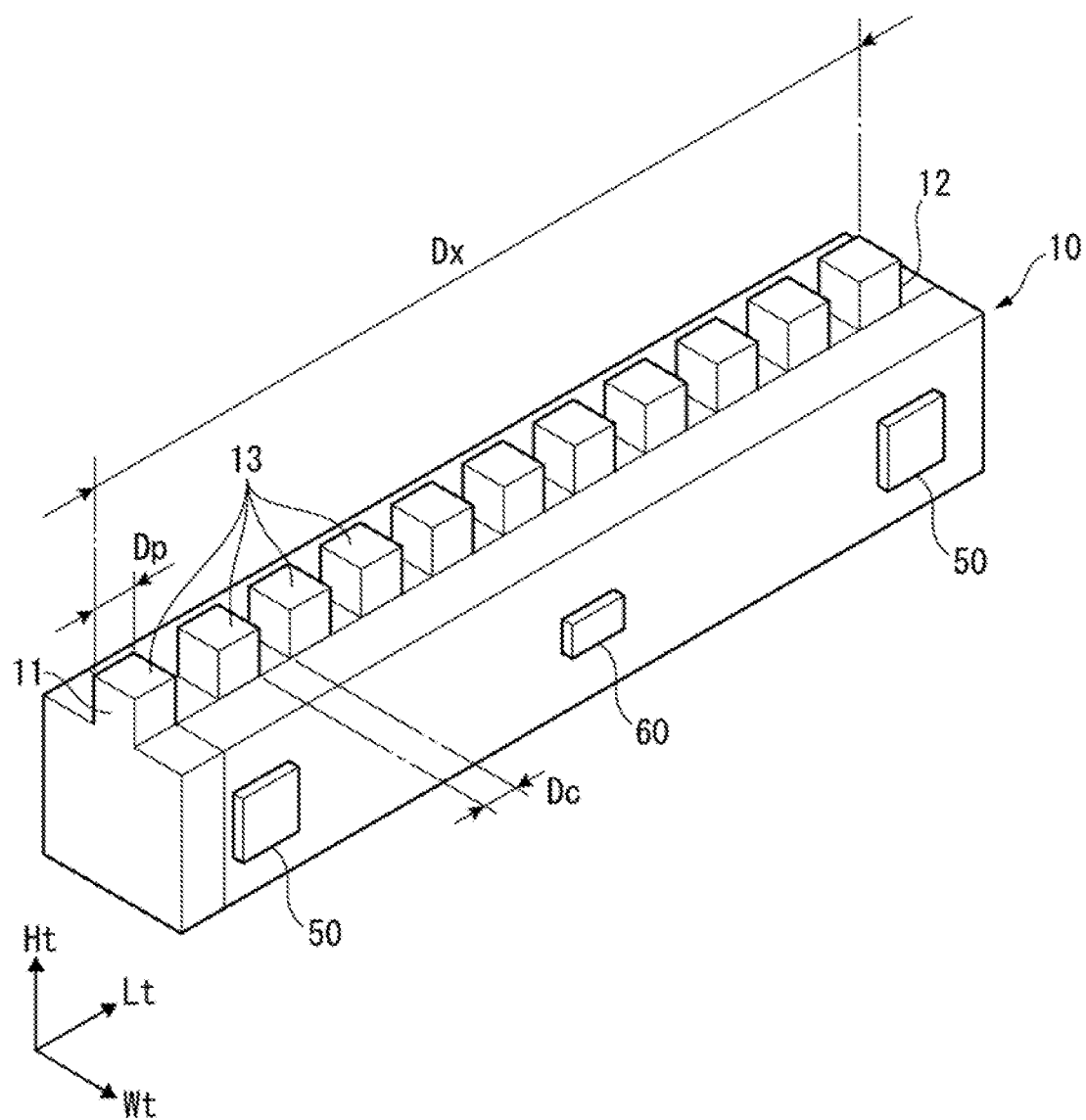
FIG. 2 is a perspective view showing a step gauge (a measurement target according to the first exemplary embodiment).

As shown in FIG. 2, the step gauge 10 (the measurement target) includes a square-column body extending in the longer direction Lt. A top face, bottom face and lateral faces of the body are parallel to one of a vertical direction Ht and width direction Wt that intersect the longer direction Lt.

A plurality of protrusions 13 each in a form of a gauge block are aligned on the upper face of the step gauge 10 in the longer direction Lt. A length of each of the protrusions 13 in the longer direction Lt is denoted by Dp. A dimension of a recess defined between opposing ones of the protrusions 13 in the longer direction Lt is denoted by Dc.

In the first exemplary embodiment, a surface of one of the protrusions 13 at a first end of the step gauge 10 is denoted by a first surface 11, a surface of another one of the protrusions 13 at a second end of the step gauge 10 is denoted by a second surface 12, and a distance between the first surface 11 and the second surface 12 is measured as a length Dx of the step gauge 10.

Figure 3:
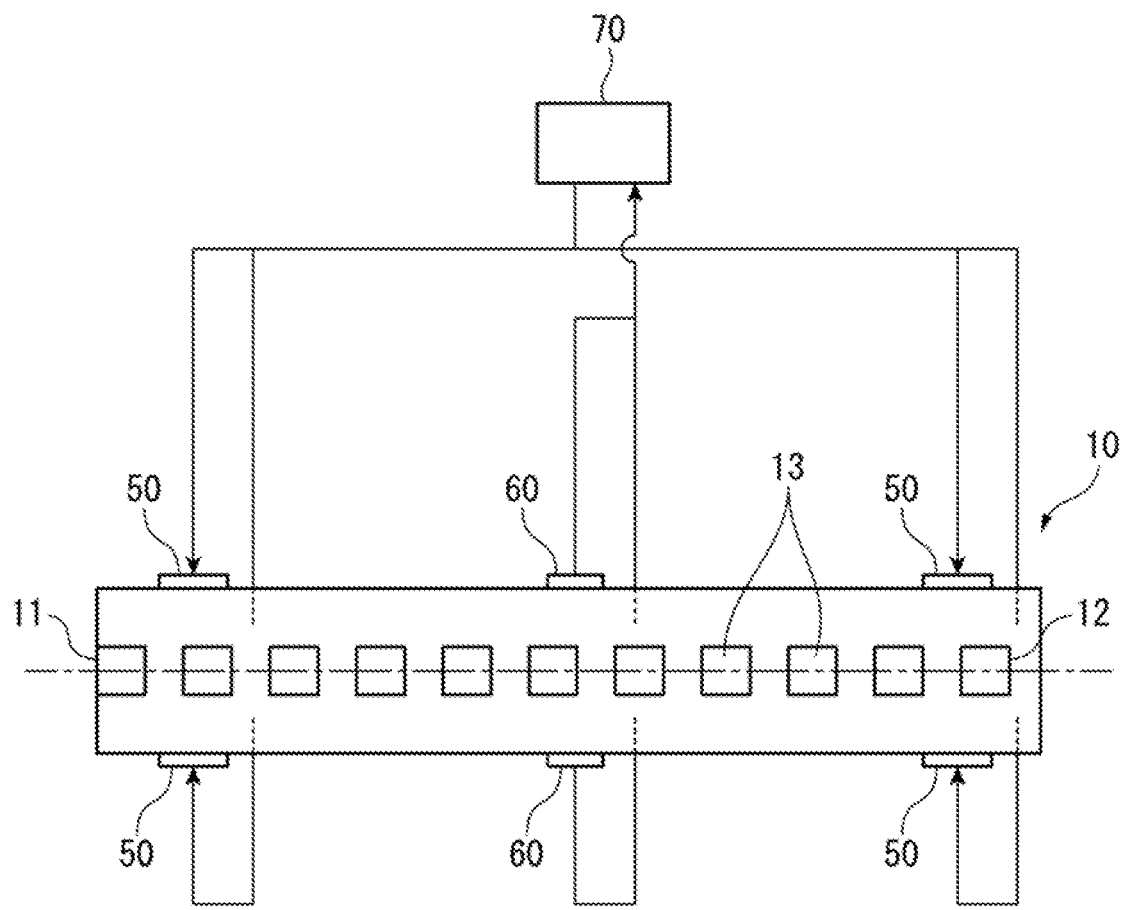
FIG. 3 is a plan view showing the step gauge (the measurement target according to the first exemplary embodiment).

As shown in FIG. 3, measurement-target temperature adjusters 50 are attached to one of the lateral faces of the step gauge 10 in the longer direction Lt near the first surface 11 and the second surface 12. Further, other measurement-target temperature adjusters 50 are likewise attached to the other lateral face near the first surface 11 and the second surface 12. In other words, the measurement-target temperature adjusters 50 are attached to the pair of lateral faces of the step gauge 10 at symmetric positions with respect to a center axis of the step gauge 10 in the longer direction Lt.

Further, a measurement-target thermometer 60 is centrally attached to each of the pair of lateral faces to measure the temperature of the step gauge 10.

The measurement-target temperature adjusters 50, which are configured to change the temperature of the step gauge 10, are each in a form of a film heater with a small heat capacity according to the first exemplary embodiment. The temperature of the step gauge 10 is raised with heat applied by the film heater.

The measurement-target thermometers 60 are configured to measure a surface temperature of the step gauge 10. An average of the respective measurement results of the measurement-target thermometers 60 is detected as a measurement temperature ts1.

In the first exemplary embodiment, the measurement-target temperature adjusters 50 and the measurement-target thermometers 60 are connected to temperature adjusting equipment 70.

The temperature adjusting equipment 70, which has an output intensity adjusting function, is configured to adjust an output from each of the measurement-target temperature adjusters 50.

Further, the temperature adjusting equipment 70, which also has an overheat prevention function, is configured to set a threshold temperature $\Delta t$ in advance and stop an operation of each of the measurement-target temperature adjusters 50 when a difference between the measurement temperature ts1 of the step gauge 10 and a temperature setpoint set for the measurement-target temperature adjusters 50 falls below a threshold temperature $\Delta t$. The step gauge 10 can thus be prevented from being overheated.

As shown in FIG. 4, the reference gauge block 20 (the reference gauge) is a gauge block extending in the longer direction Lr. A top face, bottom face and lateral faces of the reference gauge block 20 are each parallel to one of a vertical direction Hr and width direction Wr that intersect the longer direction Lr.

A first reference surface 21 and a second reference surface 22 of the reference gauge block 20 are defined by a pair of end faces at both ends in the longer direction Lr.

A distance between the first reference surface 21 and the second reference surface 22 (i.e. a length) of the reference gauge block 20 is denoted by Drx. The length Drx of the reference gauge block 20 is shorter than the to-be-measured length Dx (nominal dimension) of the step gauge 10 (i.e. the measurement target) by a predetermined dimension (e.g. a length Dp of each of the protrusions 13).

The length Drx of the reference gauge block 20 is known. Further, the reference gauge block 20 is made of an ultra-low or zero coefficient-of-expansion material, an expansion of which due to a temperature change between later-described first temperature t1 and second temperature t2 is negligible in terms of accuracy. Thus, in relative measurement at each of the first and second temperatures t1 and t2, the length Drx measured at each of the temperatures t1 and t2 can be highly accurately calculated.

Figure 5:
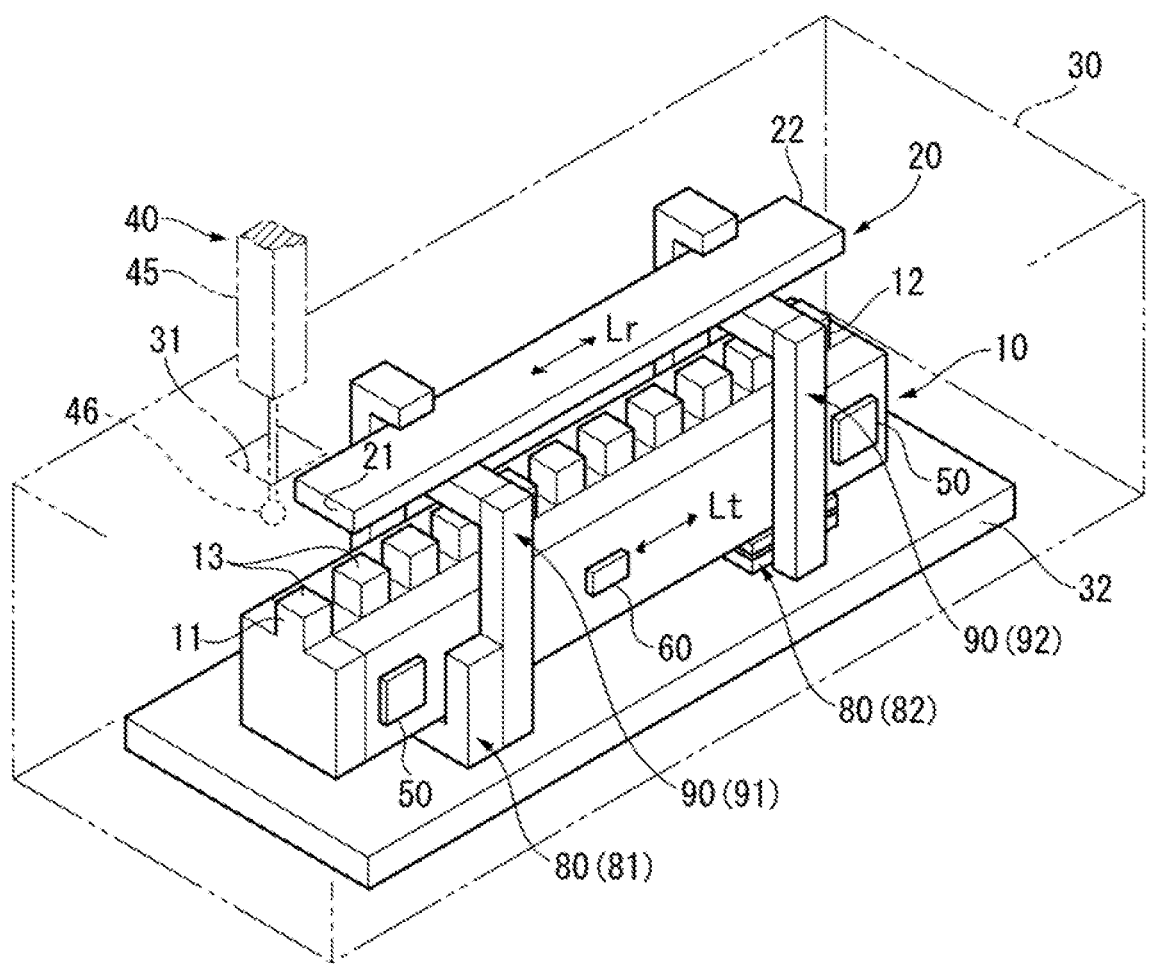
FIG. 5 is a perspective view showing an arrangement of a temperature-controlled chamber, the step gauge and the reference gauge block according to the first exemplary embodiment.

As shown in FIG. 5, the step gauge 10 and the reference gauge block 20 are placed in the temperature-controlled chamber 30 in parallel with each other.

In order to support the step gauge 10 and the reference gauge block 20, a highly rigid bottom plate 32 is placed in the temperature-controlled chamber 30. A measurement target support base 80 and a reference gauge support base 90 are placed on an upper face of the bottom plate 32.

The measurement target support base 80 includes a first measurement target support base 81 near the first surface 11 and a second measurement target support base 82 near the second surface 12.

The reference gauge support base 90 includes a first reference gauge support base 91 near the first reference surface 21 and a second reference gauge support base 92 near the second reference surface 22.

CTE Measurement Operation

Figure 6:
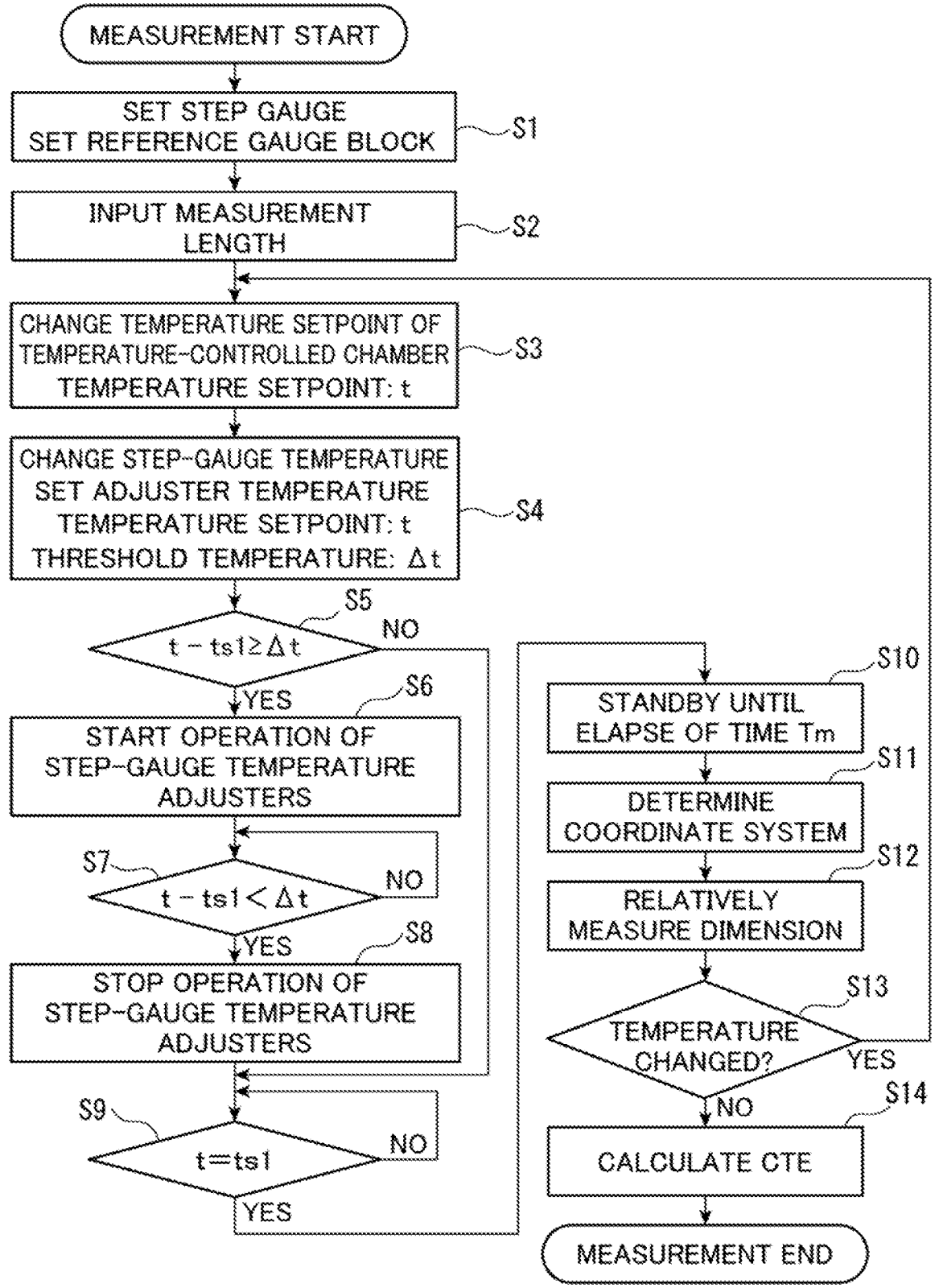
FIG. 6 is a flow chart showing a measurement process according to the first exemplary embodiment.

FIG. 6 shows a measurement process of the CTE α of the step gauge 10 using the CTE measuring device 1.

At the start of the measurement, the CTE measuring device 1 is initially assembled by fixing the temperature-controlled chamber 30 on the coordinate measuring machine 40, and the step gauge 10 and the reference gauge block 20 are placed inside the temperature-controlled chamber 30 (Step S1).

In placing the step gauge 10 and the reference gauge block 20 inside the temperature-controlled chamber 30, the first measurement target support base 81 and the second measurement target support base 82 are initially placed to support the step gauge 10. Subsequently, the first reference gauge support base 91 and the second reference gauge support base 92 are placed to extend over the step gauge 10 to support the reference gauge block 20.

Figure 7:
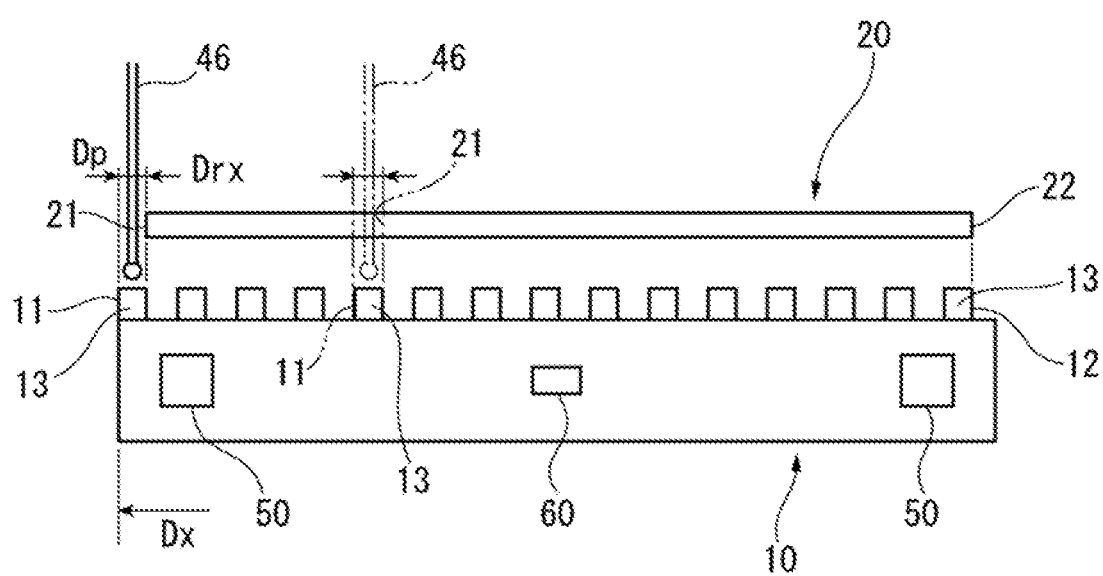
FIG. 7 is a side elevational view showing a layout of the device according to the first exemplary embodiment.

As shown in FIG. 7, in placing the step gauge 10 and the reference gauge block 20, the position of the step gauge 10 in the longer direction Lt and the position of the reference gauge block 2 in the longer direction Lr are adjusted so that the second surface 12 and the second reference surface 22 are coplanar with each other.

The length Drx of the reference gauge block 20 is shorter than the length Dx of the step gauge 10 by the length Dp of each of the protrusions 13. Thus, when the second reference surface 22 and the second surface 12 are coplanar with each other, the first reference surface 21 is offset from the first surface 11 by the length Dp of each of the protrusions 13 with an upper face of the protrusion 13 that defines the first surface 11 being uncovered by the reference gauge block 20.

Referring back to FIG. 6, when the step gauge 10 and the reference gauge block 20 are placed (Step S1), a measurement length (the length Dx of the step gauge 10) is inputted to the coordinate measuring machine 40 (Step S2).

Subsequently, the length of the step gauge 10 is relatively measured at each of predetermined different temperatures for measurement of the CTE α (Steps S3 to S12).

Initially, while all of the measurement openings 31 are closed, the temperature inside the temperature-controlled chamber 30 is changed to the first temperature t1 (Step S3). The temperature of the air inside the temperature-controlled chamber 30 is thus gradually raised, and the step gauge 10 is indirectly heated with this heated air.

Subsequently, to promptly raise the temperature of the step gauge 10 to the first temperature t1, the measurement-target temperature adjusters 50 apply heat to the step gauge 10.

In heating using the measurement-target temperature adjusters 50, a temperature setpoint of the measurement-target temperature adjusters 50 is initially set at the first temperature t1 and a threshold temperature is set at Δt (Step S4).

Subsequently, it is determined whether a difference between the measurement temperature ts1 of the step gauge 10 and the first temperature t1 is equal to or more than the threshold temperature Δt (i.e. t1−ts1≥Δt) (Step S5).

When the different is determined to be equal to or more than threshold temperature Δt, the operation of the measurement-target temperature adjusters 50 is started to directly heat the step gauge 10 (Step S6). In contrast, when the different is determined to be less than the threshold temperature Δt, the process advances to Step S9 (described later).

Further, the output of each of the measurement-target temperature adjusters 50 is adjusted depending on the difference between the measurement temperature ts1 of the step gauge 10 and the first temperature t1 by the output intensity adjusting function of the temperature adjusting equipment 70. In other words, the output is increased in response to a larger difference between the measurement temperature ts1 and the first temperature t1, and is reduced in response to a smaller difference. Subsequently, it is determined whether the difference between the measurement temperature ts1 of the step gauge 10 and the first temperature t1 is less than the threshold temperature Δt (i.e. t1−ts1<Δt) (Step S7), and the operation of the measurement-target temperature adjusters 50 is stopped by the overheat prevention function of the temperature adjusting equipment 70 when the difference is determined to be less than the threshold temperature Δt (Step S8). In other words, the measurement-target temperature adjusters 50 are kept in operation while the output of the measurement-target temperature adjusters 50 is adjusted, until the difference between the measurement temperature ts1 and the first temperature t1 falls below the threshold temperature Δt. The temperature of the step gauge 10 can thus be promptly raised to the first temperature t1.

Even after the operation of the measurement-target temperature adjusters 50 is stopped, the step gauge 10 is kept heated with the air inside the temperature-controlled chamber 30. The step gauge 10 is thus indirectly heated until the measurement temperature ts1 reaches the first temperature t1 (Step S9).

Subsequently, when the measurement temperature ts1 reaches the first temperature t1, the CTE measuring device 1 stands by until the elapse of a preset standby time Tm, allowing for stabilizing the internal temperature of the step gauge 10 (Step S10). The standby time Tm is experientially set at approximately 30 minutes.

When the internal temperature of the step gauge 10 is stabilized in Step S10, a coordinate system of the reference gauge block 20 and the step gauge 10 is determined (Step S11).

Figure 8:
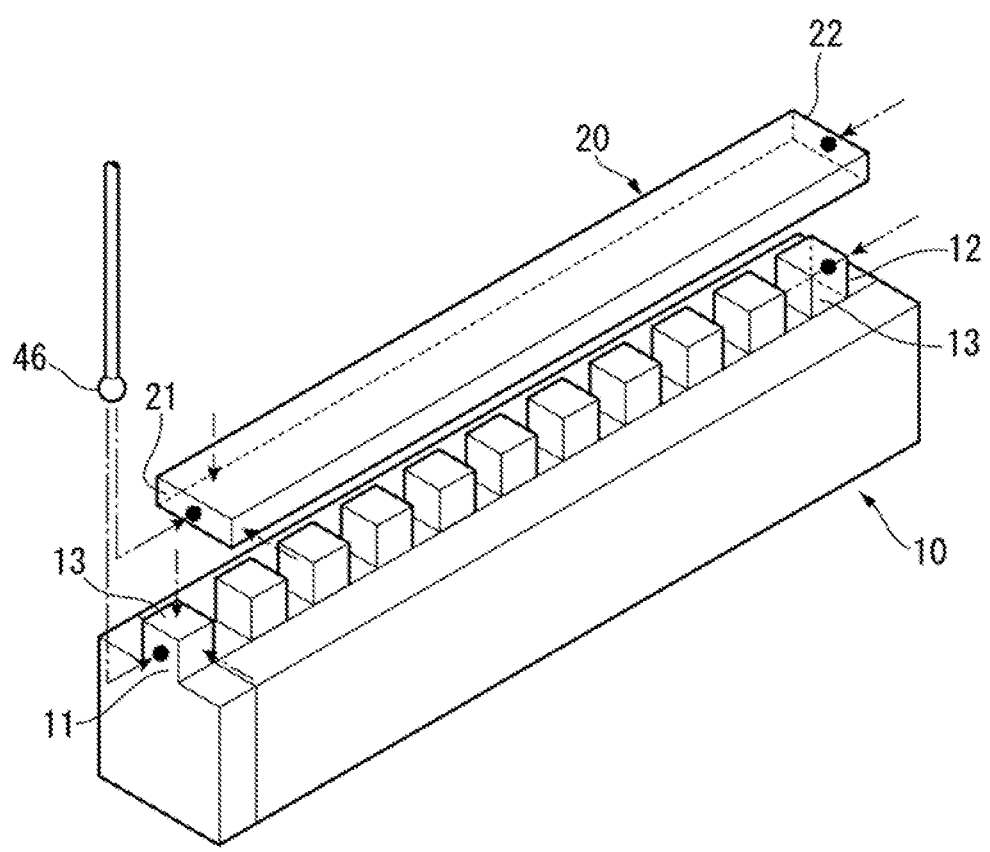
FIG. 8 is a perspective view showing a measurement operation according to the first exemplary embodiment.

Specifically, as shown in FIGS. 1 to 5, one of the measurement openings 31 near the first surface 11 is opened and the probe 46 of the coordinate measuring machine 40 is introduced thereinto. Then, the probe 46 is brought into contact with three or more points on the first surface 11 of the step gauge 10 to detect the position and inclination of the first surface 11 as shown in FIG. 8. Further, the probe 46 is brought into contact with two or more points on one of an upper face and one of lateral faces of the protrusion 13 defining the first surface 11 to detect an orientation of the axis, and with one or more points on the other surfaces to detect the position and inclination of the protrusion 13. Thus, the three-dimensional coordinates of the center point of the first surface 11 and the orientation of the longer direction Lt of the step gauge 10 are obtained. It should be noted that any other coordinate-system determining method capable of determining the three-dimensional coordinates and orientation may be used.

Similarly, the probe 46 is brought into contact with the first reference surface 21 and adjacent upper face and one of lateral faces of the reference gauge block 20 to obtain the three-dimensional coordinates of the center point of the first reference surface 21 and the orientation of the reference gauge block 20 in the longer direction Lr.

Further, the probe 46 is introduced through one of the measurement openings 31 near the second surface 12 to measure the second surface 12 of the step gauge 10 and the second reference surface 22 of the reference gauge block 20, thereby obtaining the three-dimensional coordinates of the center points of the second surface 12 and the second reference surface 22.

Referring back to FIG. 6, when the three-dimensional coordinates of the step gauge 10 and the reference gauge block 20 are determined, a dimension of each of the step gauge 10 and the reference gauge block 20 is relatively measured (Step S12).

Specifically, in the coordinate system determined in Step S11, a distance between the first surface 11 and the second surface 12 (i.e. an accurate value of the length Dx) can be relatively measured by calculation from the distance between the first reference surface 21 and the second reference surface 22 (the length Drx of the reference gauge block 20) with reference to a distance between the center point of the first surface 11 and the center point of the first reference surface 21 and a distance between the center point of the second surface 12 and the center point of the second reference surface 22.

When the relative measurement of the distance between the first surface 11 and the second surface 12 at the first temperature t1 is completed, it is determined whether the relative measurement operations at the second temperature t2 are to be performed (Step S13), and the above-described relative measurement operations (Steps S3 to S12) are repeated.

Thus-obtained length Dx1 at the first temperature t1 and length Dx2 at the second temperature t2 are used for the calculation of the CTE $\alpha=[(Dx1-Dx2)/D]/(t1-t2)$ (D denotes the length of the step gauge 10) of a section of the step gauge 10 defined between the first surface 11 and the second surface 12 (Step S14). It should be noted that the length D, which is usually a nominal length at 20 degrees C. (an industry standard temperature), may be one of or an average of the measured length Dx1 and length Dx2. Since the length D in either case is sufficiently large with respect to the thermal deformation $\Delta D=(Dx1-Dx2)$, the calculation of the CTE $\alpha$ is not significantly influenced by the nature of the length D.

Advantages of First Exemplary Embodiment

The above-described first exemplary embodiment provides the following advantages.

In the first exemplary embodiment, the step gauge 10 is directly heated using the measurement-target temperature adjusters 50, while being indirectly heated using the temperature-controlled chamber 30. Such heating can shorten the time required to evenly stabilize the temperature of the step gauge 10 at the temperature setpoint, allowing the CTE $\alpha$ of the step gauge 10 to be highly accurately measured in a short time.

In the first exemplary embodiment, the measurement-target temperature adjusters 50 are attached to the pair of lateral faces of the step gauge 10 at the symmetric positions with respect to the center axis of the step gauge 10 in the longer direction Lr, and can thus evenly heat the entirety of the step gauge 10. Such heating can shorten the time required to evenly stabilize the temperature of the step gauge 10 at the temperature setpoint, allowing the CTE $\alpha$ of the step gauge 10 to be highly accurately measured in a short time.

In the first exemplary embodiment, the output intensity adjusting function of the temperature adjusting equipment 70 allows the output of the measurement-target temperature adjusters 50 to be adjusted depending on the difference between the measurement temperature ts1 of the step gauge 10 and the temperature setpoint. Such adjustment can shorten the time required for the temperature of the step gauge 10 to reach the temperature setpoint, allowing the CTE $\alpha$ of the step gauge 10 to be highly accurately measured in a short time.

Further, in the first exemplary embodiment, the overheat prevention function of the temperature adjusting equipment 70 allows the measurement-target temperature adjusters 50 to stop operation when the difference between the measurement temperature ts1 of the step gauge 10 and the temperature setpoint falls below the threshold temperature $\Delta t$. The step gauge 10 can thus be stabilized at the temperature setpoint in a shorter time without being overheated.

Further, in the first exemplary embodiment, the measurement-target temperature adjusters 50 are each in a form of the film heater with a small heat capacity. The measurement-target temperature adjusters 50 can thus less affect the temperature of the step gauge 10 after they stop operating, allowing the temperature of the step gauge 10 to be stabilized at the temperature setpoint in a shorter time.

In the first exemplary embodiment, the reference gauge block 20 is used as a length master and the relative measurement of the length with respect to the reference gauge block 20 is performed in measuring the length of the step gauge 10 using the coordinate measuring machine 40. Thus, the results of the length measurement are not dependent on the accuracy of the scale of the coordinate measuring machine 40 but are solely dependent on the accuracy of the reference gauge block 20, allowing for highly accurately measuring the length of the step gauge 10.

Second Exemplary Embodiment

Figure 9:
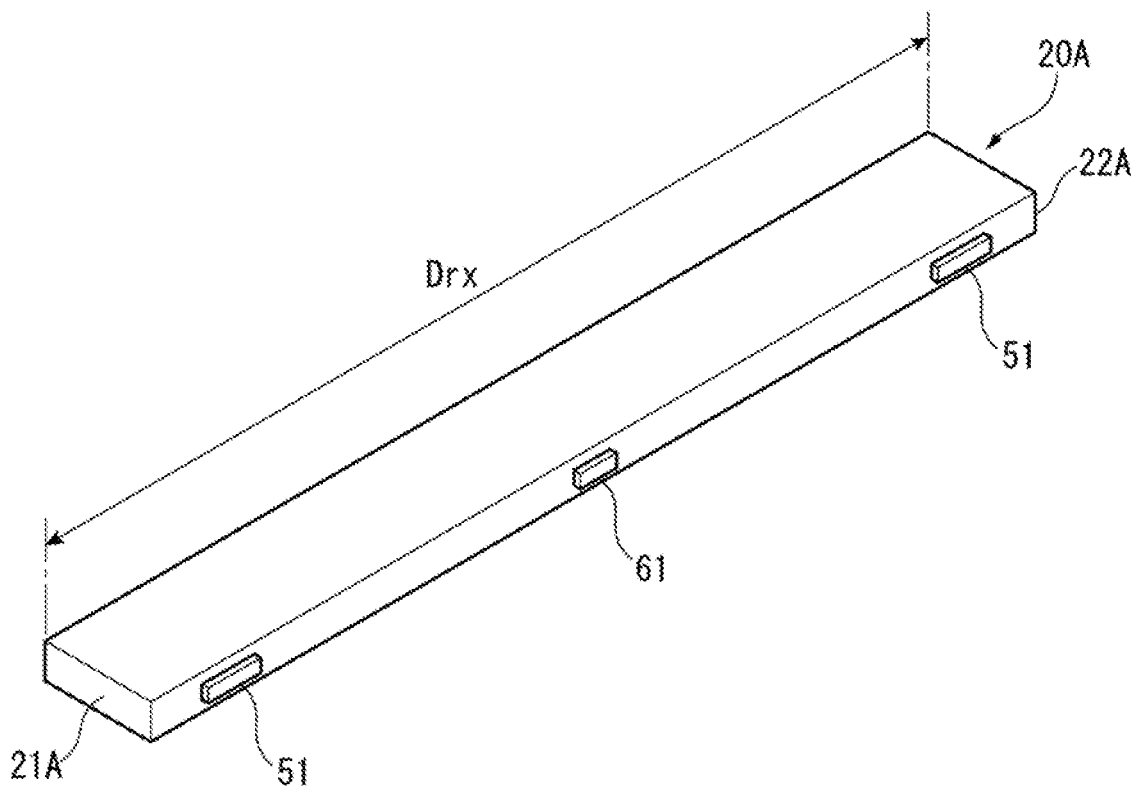
FIG. 9 is a perspective view showing a reference gauge block (a reference gauge according to a second exemplary embodiment of the invention).
Figure 10:
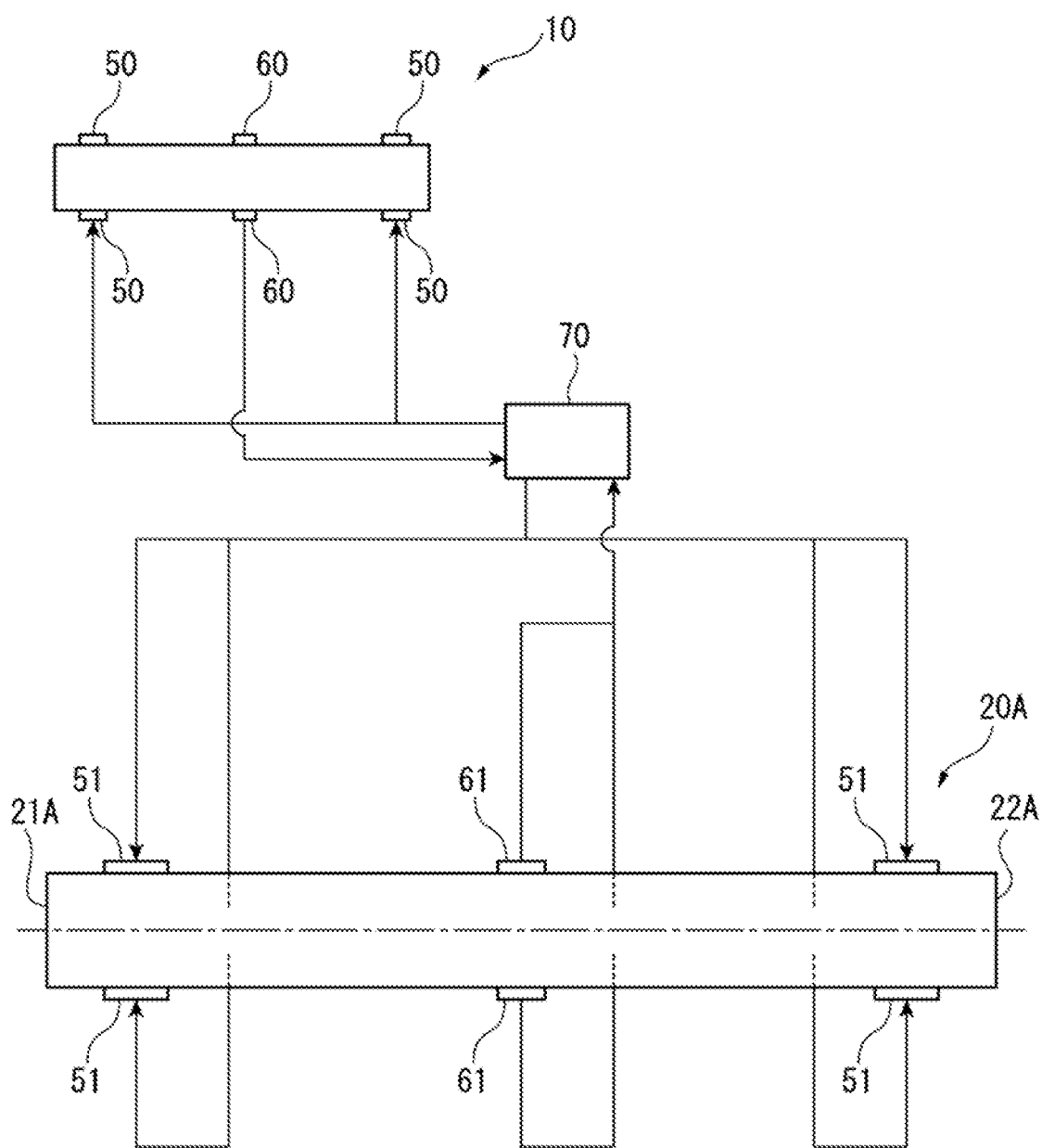
FIG. 10 is a plan view showing the reference gauge block (the reference gauge according to the second exemplary embodiment).

FIGS. 9 and 10 show a reference gauge block 20A according to a second exemplary embodiment of the invention.

The components of the second exemplary embodiment including the CTE measuring device 1 are the same as those of the first exemplary embodiment except for the reference gauge block 20A. Accordingly, only the different component(s) will be described below.

As shown in FIGS. 9 and 10, reference-gauge temperature adjusters 51 and reference-gauge thermometers 61 are attached to the reference gauge block 20A at positions similar to those of the corresponding components for the step gauge 10. Specifically, the reference-gauge temperature adjusters 51 are attached to a pair of lateral faces of the reference gauge block 20A near first reference surface 21A and near second reference surface 22A, and the reference-gauge thermometers 61 are centrally attached to the lateral faces.

Similarly to the measurement-target temperature adjusters 50, the reference-gauge temperature adjusters 51 are each in a form of a film heater with a small heat capacity, and the temperature of the reference gauge block 20A is raised with heat applied by the heat heater.

The reference-gauge thermometers 61 are configured to measure a surface temperature of the reference gauge block 20A, and an average of the respective measurement results of the reference-gauge thermometers 61 is detected as a measurement temperature ts2.

In the second exemplary embodiment, the reference-gauge temperature adjusters 51 and the reference-gauge thermometers 61 are connected to the temperature adjusting equipment 70. The temperature adjusting equipment 70 has an output intensity adjusting function and an overheat prevention function for the reference-gauge temperature adjusters 51.

In the second exemplary embodiment, the same process as in the first exemplary embodiment is performed to raise a temperature of the reference gauge block 20A to the temperature setpoint in substantially the same time as the step gauge 10. The CTE $\alpha$ of the step gauge 10 can thus be measured with a higher accuracy with reference to the thermal expansion of the reference gauge block 20A at each of the first temperature t1 and the second temperature t2.

Modification(s)

It should be understood that the scope of the invention is not limited to the above-described exemplary embodiment(s) but includes modifications and the like compatible with an object of the invention.

For instance, although the above exemplary embodiment(s) employ a film heater as each of the measurement-target temperature adjusters 50 and the reference-gauge temperature adjusters 51, these elements may each be a tape heater or a mantle heater. Alternatively, instead of the above heating device, a cooling device such as a water-circulation cooler may be employed. Further, a heating/cooling device such as a Peltier element is also available.

In the above exemplary embodiment(s), although the measurement-target temperature adjusters 50 are attached to the pair of lateral faces of the step gauge 10 at the symmetric positions with respect to the center axis of the step gauge 10 in the longer direction Lt, these elements may be attached at any positions, such as positions opposite across a center of the step gauge 10, where they can apply heat evenly to the step gauge 10.

In the above exemplary embodiment(s), the output intensity adjusting function of the temperature adjusting equipment 70 allows the output of the measurement-target temperature adjusters 50 to be adjusted depending on the difference between the measurement temperature ts1 of the step gauge 10 and the first temperature t1. Alternatively, the output may be adjusted depending on, for instance, the temperature setpoint of measurement-target temperature adjusters 50. Further, the output of the measurement-target temperature adjusters 50 may be set constant without being adjusted. In this case, the output intensity adjusting function of the temperature adjusting equipment 70 may be omitted.

In the above exemplary embodiment(s), the overheat prevention function of the temperature adjusting equipment 70 allows the measurement-target temperature adjusters 50 to stop operation when the difference between the measurement temperature ts1 of the step gauge 10 and the first temperature t1 falls below the preset threshold temperature $\Delta$t. Alternatively, the measurement-target temperature adjusters 50 may stop operation, for instance, when the measurement temperature ts1 of the step gauge 10 reaches the first temperature t1. In this case, the overheat prevention function of the temperature adjusting equipment 70 may be omitted.

In the above exemplary embodiment(s), the measurement-target temperature adjusters 50 and the measurement-target thermometers 60 are connected to the temperature adjusting equipment 70 with the output intensity adjusting function and the overheat prevention function. Alternatively, for instance, a controller of the coordinate measuring machine 40 may be provided with these functions and connected to the measurement-target temperature adjusters 50, allowing for output intensity adjustment and prevention of overheat. In this case, the temperature adjusting equipment 70 may be omitted.

In the above exemplary embodiment(s), after the measurement temperature ts1 of the surface of the step gauge 10 is determined to be stabilized at the temperature setpoint, the CTE measuring device 1 stands by until the elapse of the preset time Tm to stabilize the internal temperature of the step gauge 10. Alternatively, for instance, a thermometer capable of measuring the internal temperature of the step gauge 10 may be employed as each of the measurement-target thermometers 60 to omit the standby time Tm for stabilizing the internal temperature. In other words, the measurement-target thermometers 60 may be used to measure the internal temperature of the step gauge 10 to determine that the measurement temperature ts1 of the inside is stabilized at the temperature setpoint so that the coordinate system can be determined before the elapse of the standby time Tm.

In the above exemplary embodiment(s), the length of the step gauge 10 is calculated at the two temperatures, such as the first temperature t1 and the second temperature t2, to calculate the CTE $\alpha$. Alternatively, the length of the step gauge 10 may be measured, for instance, at three or more temperatures to calculate the CTE $\alpha$. In this case, the CTE $\alpha$ may be calculated from an inclination of a regression line derived from the measurement result of the length of the step gauge 10 at each of the temperatures.

Further, since the CTE $\alpha$ has temperature characteristics, the measurement results of the length of the step gauge 10 at three or more temperatures may be substituted into a polynomial to derive the CTE $\alpha$ or a function expression for calculating the CTE $\alpha$.

In the above exemplary embodiment(s), the step gauge 10 is the measurement target but, alternatively, the measurement target may be a gauge block or any other dimension reference gauge.

Further, the reference gauge is not necessarily the reference gauge block 20, but may alternatively be a dedicated reference gauge or another step gauge 10 that is similar to the measurement target but in a form of a highly accurately calibrated master gauge.

The above reference gauge is preferably made of an ultra-low or zero coefficient-of-expansion material whose expansion due to the temperature change between the first temperature t1 and the second temperature t2 is negligible, or made of a material whose coefficient of expansion is known.

Although the second reference surface 22 of the reference gauge block 20 (reference gauge) and the second surface 12 of the step gauge 10 (measurement target) are coplanarly arranged in the above exemplary embodiment(s), the first reference surface 21 and the first surface 11 may alternatively be coplanarly arranged, or both ends of the reference gauge may be offset from both ends of the measurement target in a plan view.

However, if one of the ends of the reference gauge is coplanar with corresponding one of the ends of the measurement target ends, a difference in length between the reference gauge and the measurement target will be maximized at the ends opposite the coplanar ends, thereby maximizing a space for the probe of the coordinate measuring machine to perform the surface detection.

In the above exemplary embodiment(s), the length of the step gauge 10 is relatively measured with reference to the dimension of the reference gauge block 20, but may alternatively be measured using a scale-measurement function of the coordinate measuring machine 40. In this case, however, the measurement result inevitably involves an error due to the scale accuracy of the coordinate measuring machine 40. Accordingly, the relative measurement using, for instance, a reference gauge is preferable.

In the above exemplary embodiment(s), although the coordinate measuring machine 40 is used to measure the length of the step gauge 10, for instance, an optical interferometer or a strain gauge may alternatively be used. In this case, the measurement openings 31 for the probe 46 of the coordinate measuring machine 40 to enter the temperature-controlled chamber 30 may be omitted.

What is claimed is:

1. A coefficient-of-thermal-expansion measurement method for measuring a coefficient of thermal expansion of a measurement target having first and second surfaces, the method comprising:
   obtaining:
      a temperature-controlled chamber configured to house the measurement target, the temperature-controlled chamber having an adjustable internal temperature;
      a distance measuring device configured to measure a distance between the first surface and the second surface, at least one measurement-target temperature adjuster placed in the temperature-controlled chamber and configured to heat or cool the measurement target; and
      a measurement-target thermometer attached to the measurement target and configured to measure a temperature of the measurement target;
   placing the measurement target in the temperature-controlled chamber;
   heating or cooling the measurement target using the temperature-controlled chamber and the measurement-target temperature adjuster after a temperature setpoint of the temperature-controlled chamber and the measurement-target temperature adjuster is set at a first temperature;
   measuring the distance between the first surface and the second surface after the temperature measured by the measurement-target thermometer is determined to be stabilized at the first temperature;
   heating or cooling the measurement target using the temperature-controlled chamber and the measurement-target temperature adjuster after the temperature setpoint of the temperature-controlled chamber and the measurement-target temperature adjuster is changed to a second temperature;
   measuring the distance between the first surface and the second surface after the temperature measured by the measurement-target thermometer is determined to be stabilized at the second temperature;
   calculating the coefficient of thermal expansion of the measurement target from the distance between the first surface and the second surface at the first temperature and the distance between the first surface and the second surface at the second temperature;
   obtaining a reference gauge having a first reference surface and a second reference surface respectively corresponding to the first surface and the second surface, a distance from the first reference surface to the second reference surface being known;
   placing the reference gauge in the temperature-controlled chamber along with the measurement target; and
   relatively measuring the distance between the first surface and the second surface with reference to a distance between the first reference surface and the second reference surface.

2. The coefficient-of-thermal-expansion measurement method according to claim 1, wherein the at least one measurement-target temperature adjuster comprises measurement-target temperature adjusters attached to at least a pair of faces of the measurement target at symmetric positions with respect to a center axis of the measurement target.

3. The coefficient-of-thermal-expansion measurement method according to claim 1, wherein an output of the measurement-target temperature adjuster is adjusted depending on a difference between the temperature measured by the measurement-target thermometer and the temperature setpoint of the measurement-target temperature adjuster.

4. The coefficient-of-thermal-expansion measurement method according to claim 1, wherein the measurement-target temperature adjuster stops operating when a difference between the temperature measured by the measurement-target thermometer and the temperature setpoint falls below a desired threshold.

5. The coefficient-of-thermal-expansion measurement method according to claim 1, wherein a heat capacity of the measurement-target temperature adjuster is smaller than a heat capacity of the measurement target.

6. The coefficient-of-thermal-expansion measurement method according to claim 1, wherein the reference gauge is made of an ultra-low or zero coefficient-of-expansion material whose expansion due to a temperature change between the first temperature and the second temperature is negligible in terms of accuracy, or made of a material whose coefficient of expansion is known.

7. The coefficient-of-thermal-expansion measurement method according to claim 1, further comprising:
   obtaining:
      a reference-gauge temperature adjuster placed in the temperature-controlled chamber and configured to heat or cool the reference gauge; and
      a reference-gauge thermometer attached to the reference gauge and configured to measure a temperature of the reference gauge;
   heating or cooling the measurement target and the reference gauge using the temperature-controlled chamber, the measurement-target temperature adjuster and the reference-gauge temperature adjuster after a temperature setpoint of the temperature-controlled chamber, the measurement-target temperature adjuster and the reference-gauge temperature adjuster is set at the first temperature;
   relatively measuring the distance between the first surface and the second surface after the temperature measured by each of the measurement-target thermometer and the reference-gauge thermometer is determined to be stabilized at the first temperature;
   heating or cooling the measurement target and the reference gauge using the temperature-controlled chamber, the measurement-target temperature adjuster and the reference-gauge temperature adjuster after the temperature setpoint of the temperature-controlled chamber, the measurement-target temperature adjuster and the reference-gauge temperature adjuster is changed to the second temperature;

relatively measuring the distance between the first surface and the second surface after the temperature measured by each of the measurement-target thermometer and the reference-gauge thermometer is determined to be stabilized at the second temperature; and calculating the coefficient of thermal expansion of the measurement target from the distance between the first surface and the second surface at the first temperature and the distance between the first surface and the second surface at the second temperature.

8. A coefficient-of-thermal-expansion measuring device configured to measure a coefficient of thermal expansion of a measurement target having first and second surfaces, the device comprising:

a temperature-controlled chamber configured to house the measurement target, the temperature-controlled chamber having an adjustable internal temperature;

a distance measuring device configured to measure a distance between the first surface and the second surface;

a measurement-target temperature adjuster placed in the temperature-controlled chamber and configured to change a temperature of the measurement target;

a measurement-target thermometer attached to the measurement target and configured to measure the temperature of the measurement target; and a reference gauge having a first reference surface and a second reference surface respectively corresponding to the first surface and the second surface, a distance from the first reference surface to the second reference surface being known, wherein the reference gauge is configured to be in the temperature-controlled chamber along with the measurement target; and the coefficient-of-thermal-expansion measuring device is configured to relatively measure the distance between the first surface and the second surface with reference to a distance between the first reference surface and the second reference surface.

9. The coefficient-of-thermal-expansion measuring device according to claim 8, wherein the distance measuring device comprises a coordinate measuring machine, and the temperature-controlled chamber is provided with a measurement opening through which a measurement probe of the coordinate measuring machine is introduced into the temperature-controlled chamber to reach a measurement surface of the measurement target.

\* \* \* \* \*